(12) United States Patent
Fujimura et al.

(10) Patent No.: US 9,796,254 B2
(45) Date of Patent: Oct. 24, 2017

(54) VEHICLE SEALING MEMBER AND ATTACHMENT STRUCTURE OF VEHICLE SEALING MEMBER

(71) Applicant: Nishikawa Rubber Co., Ltd., Hiroshima (JP)

(72) Inventors: Yoshio Fujimura, Hiroshima (JP); Atsuo Masumoto, Hiroshima (JP)

(73) Assignee: Nishikawa Rubber Co., Ltd., Hiroshima (JP)

( * ) Notice: Subject to any disclaimer, the term of this patent is extended or adjusted under 35 U.S.C. 154(b) by 0 days.

(21) Appl. No.: 15/152,062

(22) Filed: May 11, 2016

(65) Prior Publication Data

US 2016/0339770 A1    Nov. 24, 2016

(30) Foreign Application Priority Data

May 19, 2015   (JP) ................................. 2015-101555
May 19, 2015   (JP) ................................. 2015-102036

(51) Int. Cl.
| | |
|---|---|
| *B60J 1/18* | (2006.01) |
| *B60J 10/77* | (2016.01) |
| *B60J 10/248* | (2016.01) |
| *B60J 10/30* | (2016.01) |
| *B60J 10/24* | (2016.01) |
| *B60J 10/90* | (2016.01) |

(52) U.S. Cl.
CPC ............... *B60J 10/77* (2016.02); *B60J 10/24* (2016.02); *B60J 10/248* (2016.02); *B60J 10/30* (2016.02); *B60J 10/90* (2016.02)

(58) Field of Classification Search
CPC .. Y10S 285/921; E03B 9/04; Y10T 137/5327; Y10T 137/5468; Y10T 137/5479; Y10T 285/921; F16L 37/0987; H01R 13/627; E21B 33/04; E21B 2033/005
USPC ...................................................... 296/146.14
See application file for complete search history.

(56) References Cited

U.S. PATENT DOCUMENTS

| | | | | |
|---|---|---|---|---|
| 3,195,948 | A * | 7/1965 | Sturtevant ........... | B60R 13/0206 296/146.9 |
| 3,797,857 | A * | 3/1974 | Reeves .................. | B60R 13/02 280/751 |
| 4,656,784 | A * | 4/1987 | Brachmann ............. | B60J 10/24 49/374 |

(Continued)

FOREIGN PATENT DOCUMENTS

| | | |
|---|---|---|
| DE | 19730942 A1 | 1/1998 |
| DE | 102009031913 A1 | 1/2011 |

(Continued)

OTHER PUBLICATIONS

European Patent Office, Extended European Search Report for Application No. 16168960.9, dated Jan. 30, 2017, 10 pages, Germany.

*Primary Examiner* — Kiran B Patel
(74) *Attorney, Agent, or Firm* — Alston & Bird LLP (57) ABSTRACT

A sealing member 30 includes a hollow seal portion 32. The hollow seal portion 32 has a slit 34. The hollow seal portion 32 has an engagement protrusion 44 engaged with an engagement hole 23 of a retainer 20, and a contact portion 45 coming in contact with the retainer 20 from outside in a lateral direction of a vehicle.

5 Claims, 8 Drawing Sheets

INSIDE ←                    → OUTSIDE

(56) References Cited

U.S. PATENT DOCUMENTS

| | | | | |
|---|---|---|---|---|
| 5,219,382 A * | 6/1993 | Backes | ............ | B60J 10/24 49/440 |
| 5,319,883 A * | 6/1994 | Gueneau | ............ | B60J 10/79 49/441 |
| 5,797,644 A * | 8/1998 | Hamabata | ............ | B60J 10/22 296/146.9 |
| 6,115,967 A * | 9/2000 | Warnecke | ............ | B60J 10/15 49/374 |
| 6,189,950 B1 | 2/2001 | Kawazoe et al. | | |
| 6,237,287 B1 | 5/2001 | Nakagawa et al. | | |
| 7,363,749 B2 * | 4/2008 | Sultan | ............ | B60J 10/248 49/490.1 |
| 8,832,998 B2 | 9/2014 | Kuwabara et al. | | |
| 9,038,319 B2 * | 5/2015 | Kuwabara | ............ | B60J 10/048 49/498.1 |
| 9,533,556 B2 * | 1/2017 | Samanci | ............ | B60J 10/21 |
| 9,724,987 B2 * | 8/2017 | Inai | ............ | B60J 10/84 |
| 2004/0247827 A1 * | 12/2004 | Kubo | ............ | B29C 45/0053 428/136 |
| 2005/0117270 A1 | 6/2005 | Scherraus | | |
| 2005/0127707 A1 | 6/2005 | Tsuchida | | |
| 2006/0137255 A1 * | 6/2006 | Nozaki | ............ | B60J 10/248 49/498.1 |
| 2009/0056229 A1 * | 3/2009 | Mugishima | ............ | B60J 10/248 49/493.1 |
| 2011/0162285 A1 * | 7/2011 | Lichtner | ............ | B60J 10/24 49/490.1 |
| 2011/0219701 A1 * | 9/2011 | Fukuta | ............ | B60J 10/24 49/493.1 |
| 2013/0160376 A1 | 6/2013 | Kuwabara et al. | | |
| 2014/0290143 A1 * | 10/2014 | Yamada | ............ | B60J 10/0002 49/490.1 |
| 2016/0144698 A1 * | 5/2016 | Inai | ............ | B60J 10/84 49/495.1 |
| 2017/0225555 A1 * | 8/2017 | Takeda | ............ | B60J 10/86 |

FOREIGN PATENT DOCUMENTS

| | | |
|---|---|---|
| EP | 2607127 A2 | 6/2013 |
| JP | 03-118216 A | 5/1991 |
| JP | 2003118386 A | 4/2003 |
| JP | 2013-129402 A | 7/2013 |

* cited by examiner

INSIDE ← → OUTSIDE

VEHICLE SEALING MEMBER AND ATTACHMENT STRUCTURE OF VEHICLE SEALING MEMBER

CROSS-REFERENCE TO RELATED APPLICATIONS

This application claims priority to and the benefit of Japanese Patent Application No. 2015-101555, filed May 19, 2015, and Japanese Patent Application No. 2015-102036, filed May 19, 2015, the contents of both of which as are hereby incorporated by reference in their entirety.

BACKGROUND

The present disclosure relates to a sealing member provided for a roof of, for example, a convertible or hardtop automobile, and more particularly relates to the field of a structure for sealing the gap between the roof and the upper edge of a movable window pane of a sashless door.

The present disclosure further relates to an attachment structure of a sealing member for sealing an opening of an automobile, for example, and more particularly relates to the field of a structure for attaching a sealing member to a vehicle with a retainer interposed therebetween.

A known automobile includes, as its front doors, movable window panes, and fixed side panels respectively provided in front of the movable window panes, as disclosed in, for example, Japanese Unexamined Patent Publication No. 2013-129402. A glass run made of an elastic material and a retainer for retaining the glass run are provided in front of each movable window pane. The glass run and the retainer extend in the direction of moving of the movable window pane (a vertical direction).

The glass run has a hollow seal portion with which the front edge of the movable window pane comes in contact. A portion of this hollow seal portion outside the cabin has a slit extending vertically. The formation of this slit allows the hollow seal portion to be partially open. A portion of the glass run outside the cabin has front and rear engagement grooves and two intermediate engagement grooves. The front and rear engagement grooves are respectively arranged closer to the front and rear of the automobile than the slit is, and extend vertically. The intermediate engagement grooves extend vertically along the edge of the slit of the glass run.

Meanwhile, the retainer has front and rear protruding portions that are respectively formed in the vicinity of its front and rear ends to protrude while facing each other. An intermediate portion of the retainer between the front and rear protruding portions has an intermediate protruding portion extending vertically. The front and rear protruding portions of the retainer are respectively fitted into, and engaged with, the front and rear engagement grooves of the glass run. In addition, the intermediate protruding portion of the retainer is fitted into, and engaged with, the intermediate engagement grooves of the glass run.

In general, the gap between a door and an associated door opening provided in a side part of an automobile is sealed with a sealing member called a weatherstrip (see, for example, Japanese Unexamined Patent Publication No. H03-118216). A weatherstrip of Japanese Unexamined Patent Publication No. H03-118216 is designed to be attached to the periphery of a door with a retainer interposed therebetween. Both side portions of the retainer are curved to catch both lateral ends of a base of the weatherstrip. A rising wall of the retainer is provided with a clip to fix the retainer to the door.

BRIEF SUMMARY

In Japanese Unexamined Patent Publication No. 2013-129402 described above, a hollow seal portion of a glass run has a slit to allow the hollow seal portion to be partially open. Thus, even if the core of a mold die for molding the inner face of the hollow seal portion is large, the core may be easily removed after molding, and the degree of freedom in defining the shape of the hollow seal portion may be increased.

Examples of automotive doors include so-called sashless doors with no sash surrounding a movable window pane. The sashless doors are often provided, in particular, for a convertible or hardtop automobile. Regarding a seal structure for a roof of an automobile provided with sashless doors, a movable window pane being closed is pressed against a sealing member from under it.

Paying attention to the fact that in the case of molding, the degree of freedom in defining the shape of a hollow seal portion may be increased by cutting a slit through the hollow seal portion to open part of the hollow seal portion as in the glass run of Japanese Unexamined Patent Publication No. 2013-129402, the present inventors conceived an idea of using a sealing member including a hollow seal portion having an opening portion as a sealing member for a roof of a vehicle provided with sashless doors. This may increase the degree of freedom in defining the shape of the hollow seal portion of the sealing member provided for the roof.

In the case of a sealing member provided for a roof of a vehicle including sashless doors, a movable window pane is pressed against the sealing member from under it as described above. Thus, the hollow seal portion is pressed by the movable window pane from under it. The application of this pressing force may cause the hollow seal portion to be deformed so much as to collapse downward, which deformation may deprive the sealing member of its sealability. This is because, in Japanese Unexamined Patent Publication No. 2013-129402, the hollow seal portion has the slit, and is easily deformable, and protruding portions of the retainer are merely fitted into, and engaged with, the associated engagement grooves of the glass run serving as the sealing member.

If, as in Japanese Unexamined Patent Publication No. H03-118216, a retainer merely retains a weatherstrip to catch a base of the weatherstrip, the weatherstrip is less likely to be attached in a normal state. Specifically, since the retainer of Japanese Unexamined Patent Publication No. H03-118216 merely retains the weatherstrip such that curved portions of the retainer catch the base of the weatherstrip, the weatherstrip may be unable to be accurately positioned relative to the retainer in the longitudinal direction in some cases. For example, if a weatherstrip is attached to the door relative to one end of the weatherstrip in the longitudinal direction, and if this process is carried on while the weatherstrip is pulled, the weatherstrip is more easily displaced relative to the retainer in the longitudinal direction of the weatherstrip, and the length of the weatherstrip that has been attached to the door tends to vary. In particular, as the length of the weatherstrip increases, the degree of displacement of the weatherstrip in the longitudinal direction or the magnitude of variation in the length thereof becomes more significant.

It is therefore a first object of the present disclosure to increase the degree of freedom in defining the shape of a hollow seal portion of a sealing member by opening part of the hollow seal portion, and allow the sealing member to have sufficient sealability when provided for a roof of a vehicle with sashless doors.

It is a second object of the present disclosure to prevent the attachment position of a vehicle sealing member to a retainer from shifting, and prevent the length of the vehicle sealing member from varying.

In order to achieve the first object, the present disclosure provides a vehicle sealing member to be attached to a retainer fixed to a roof of a vehicle including sashless doors. The vehicle sealing member is made of an elastic material configured to seal a gap between an upper edge of a movable window pane of an associated one of the sashless doors and the roof. The vehicle sealing member includes: a hollow seal portion against which the upper edge of the movable window pane is pressed from under the seal portion. An inner portion of the hollow seal portion in a lateral direction of the vehicle has an opening portion, and the inner portion of the hollow seal portion in the lateral direction of the vehicle has a first engagement protrusion and a contact portion. The first engagement protrusion is inserted into, and engaged with, a first engagement hole of the retainer. The contact portion comes in contact with a portion of the retainer around the first engagement hole from outside in the lateral direction of the vehicle so as to be supported by the retainer.

According to this configuration, an inner portion of a hollow seal portion in the lateral direction of a vehicle has an opening portion. Thus, in the case of molding, even if a core for molding the inner face of the hollow seal portion is large, the core may be easily removed after molding. This may allow the hollow seal portion to be molded using a large core, and may increase the degree of freedom in defining the shape of the hollow seal portion.

A sealing member is attached to a retainer such that an engagement protrusion of the hollow seal portion is inserted into, and engaged with, a first engagement hole of a retainer. In this state, when a movable window pane is being closed, the upper edge of the movable window pane is pressed against the hollow seal portion from under the seal portion. In this case, a contact portion of the hollow seal portion comes in contact with a portion of the retainer around the first engagement hole from outside in a lateral direction of the vehicle so as to be supported by the retainer. This may reduce the collapsing deformation of the hollow seal portion.

In one embodiment, a tip end portion of the first engagement protrusion of the sealing member in a direction of protrusion of the first engagement protrusion may be wider than a basal end portion of the first engagement protrusion, and the tip end portion may be engaged with an inner surface of the first engagement hole of the retainer so as to be hooked on the inner surface.

This configuration allows a tip end portion of a first engagement protrusion of a sealing member to be reliably engaged with a first engagement hole of a retainer, and makes this tip end portion hardly disengageable from the first engagement hole.

In another embodiment, the opening portion of the hollow seal portion may be covered with an outer surface of the retainer in the lateral direction of the vehicle, and a closed cross section may be defined by the hollow seal portion and the retainer.

This configuration allows a hollow seal portion to have an opening portion covered with a surface of a retainer outside the cabin, and to form a closed cross section. This further increases the sealability.

In still another embodiment, the contact portion may be provided above the first engagement protrusion.

According to this configuration, when the upper edge of a movable window pane is pressed against a hollow seal portion from under the seal portion, a first engagement protrusion is engaged with a retainer. Thus, a portion of a hollow seal portion above the first engagement protrusion, i.e., a contact portion, is pressed toward the retainer. This allows the contact portion to be reliably brought into contact with, and supported by, the retainer.

In yet another embodiment, a lower portion of the sealing member may have an extending portion extending inward from outside in the lateral direction of the vehicle to cover a lower portion of the retainer, and the extending portion may have a second engagement protrusion inserted into, and engaged with, a second engagement hole formed in the lower portion of the retainer.

According to this configuration, a second engagement protrusion of an extending portion of a sealing member is engaged with a second engagement hole of a retainer. Thus, the extending portion is retained by a lower portion of the retainer. In this case, when a movable window pane is being closed, the deformation of a hollow seal portion is reduced as described above. Thus, the engagement between the second engagement protrusion and the second engagement hole is maintained without allowing the second engagement protrusion to be disengaged from the second engagement hole.

In order to achieve the second object, an attachment structure of a vehicle sealing member to be attached to a retainer fixed to a vehicle has the following configuration:

The retainer includes at least one displacement reducer engaged with the sealing member in a longitudinal direction of the sealing member, the at least one displacement reducer being configured to reduce displacement of the sealing member in the longitudinal direction of the sealing member.

According to this configuration, when a sealing member is attached to a retainer, a displacement reducer of the retainer is engaged with the sealing member, thereby reducing the displacement of the sealing member relative to the retainer in the longitudinal direction. This may prevent the sealing member from being finally displaced relative to the retainer even if this attachment process is carried on while the sealing member, for example, is being pulled, and may also eliminate variations in the length of the sealing member.

In one embodiment, the at least one displacement reducer of the retainer may comprise a plurality of displacement reducers spaced apart from one another in the longitudinal direction of the sealing member.

According to this configuration, displacement reducers are respectively engaged with a plurality of portions of a sealing member spaced apart from one another in the longitudinal direction. This may reliably prevent the sealing member from being displaced in the longitudinal direction.

In another embodiment, the sealing member may have a plurality of engagement protrusions spaced apart from one another in the longitudinal direction of the sealing member, the retainer may have a plurality of engagement holes with which the engagement protrusions are respectively engaged while being respectively inserted into the engagement holes, the engagement holes being spaced apart from one another in the longitudinal direction of the sealing member, and the at least one displacement reducer may be configured as a wall located between adjacent ones of the engagement holes.

According to this configuration, a sealing member is attached to a retainer such that engagement protrusions of the sealing member are respectively inserted into, and engaged with, engagement holes of the retainer. In this case, a wall located between adjacent ones of the engagement holes is engaged with the sealing member. This may prevent the sealing member from being displaced relative to the retainer. More specifically, using the wall located between adjacent ones of the engagement holes may prevent the sealing member from being displaced, thus preventing the structure of the retainer from being overly complicated.

In this particular embodiment, the wall located between the adjacent ones of the engagement holes may be interposed between, and engaged with, associated adjacent ones of the engagement protrusions in the longitudinal direction of the sealing member.

According to this configuration, the interposition of a wall, located between adjacent ones of engagement holes, between the engagement protrusions may prevent, using a simple structure, the sealing member from being displaced.

In another embodiment, the at least one displacement reducer may comprise a plurality of displacement reducers arranged in a direction intersecting with the longitudinal direction of the sealing member.

This configuration allows displacement reducers of a retainer to be respectively engaged with a plurality of portions of the sealing member. This may reliably prevent the sealing member from being displaced.

According to one embodiment of the present disclosure, an inner portion of a hollow seal portion in a lateral direction of a vehicle has an opening portion. Thus, in the case of molding, even if a core of a mold die is large, the core may still be easily removed after molding, and the degree of freedom in defining the shape of the hollow seal portion may be increased. A first engagement protrusion of the hollow seal portion may be inserted into, and engaged with, a first engagement hole of a retainer, so that a sealing member is attached to the retainer. If, in this state, the upper edge of a movable window pane being closed is pressed against the hollow seal portion from under the seal portion, a contact portion of the hollow seal portion comes in contact with a portion of the retainer around a first engagement hole so as to be supported by the retainer. This may reduce the collapsing deformation of the hollow seal portion, and as a result, may ensure sufficient sealability.

In addition, a displacement reducer of the retainer is engaged with the sealing member in a longitudinal direction thereof to reduce the displacement of the sealing member in the longitudinal direction. This may prevent the position of the sealing member attached to the retainer from being shifted, and may prevent the length of the sealing member from varying.

DETAILED DESCRIPTION OF VARIOUS EMBODIMENTS

An embodiment of the present disclosure will now be described with reference to the drawings. The following preferred embodiment is merely illustrative in nature, and is not intended to limit the scope, applications, or use of the present disclosure.

Figure 1:
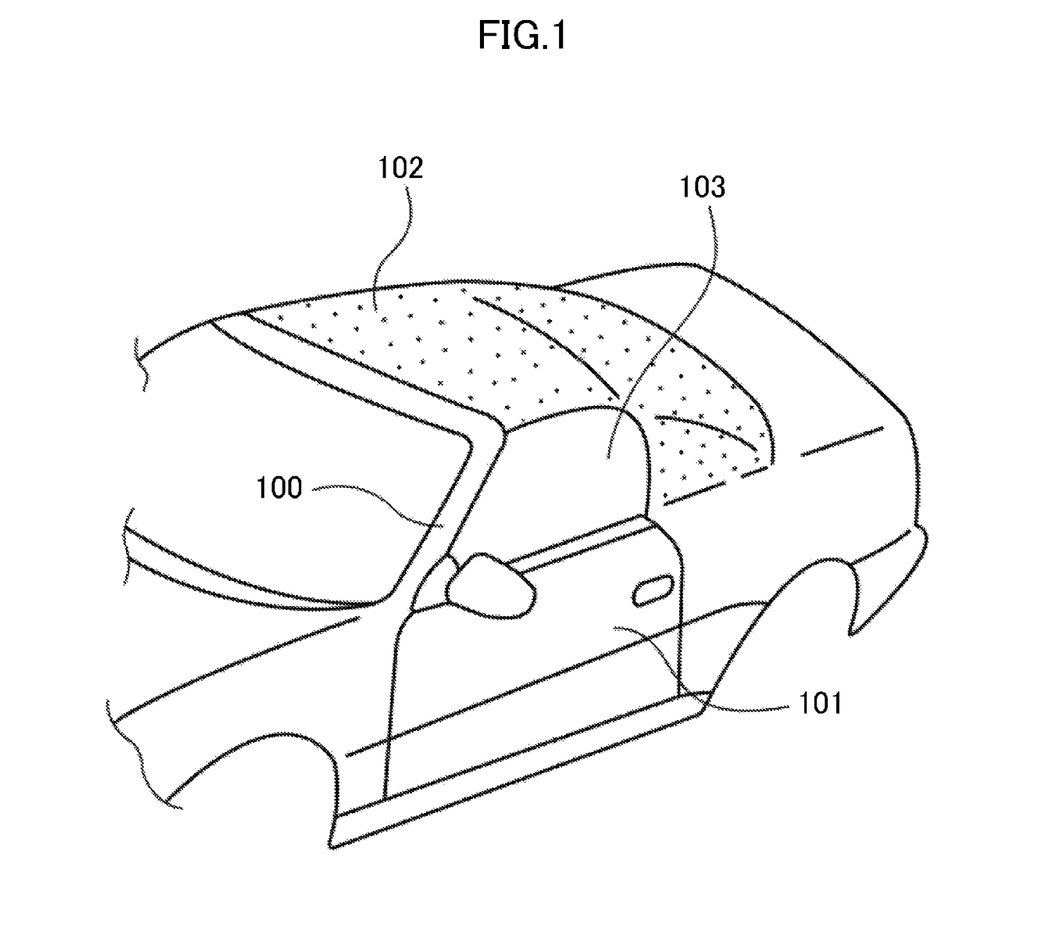
FIG. 1 is a perspective view of a vehicle to which a vehicle sealing member according to an embodiment has been attached.

FIG. 1 is a perspective view illustrating a portion of a vehicle including a vehicle sealing member 1 according to an embodiment of the present disclosure. The vehicle illustrated in FIG. 1 is a convertible vehicle including a retractable roof 102. A covering material of the roof 102 may be a fabric material, a panel material made of metal, or any other suitable material.

In the description of this embodiment, the front side of the vehicle will be simply referred to as a "front," and the rear side of the vehicle will be simply referred to as a "rear." In the following description, the present disclosure is supposed to be applied to a convertible vehicle. However, the present disclosure may also be applied to a hardtop vehicle, for example. Unlike the convertible vehicle, the hardtop vehicle includes an unretractable roof 102. However, the hardtop vehicle includes front doors 101 and other parts having substantially the same fundamental structure as the convertible vehicle. Thus, the hardtop vehicle will not be described in detail.

Figure 2:
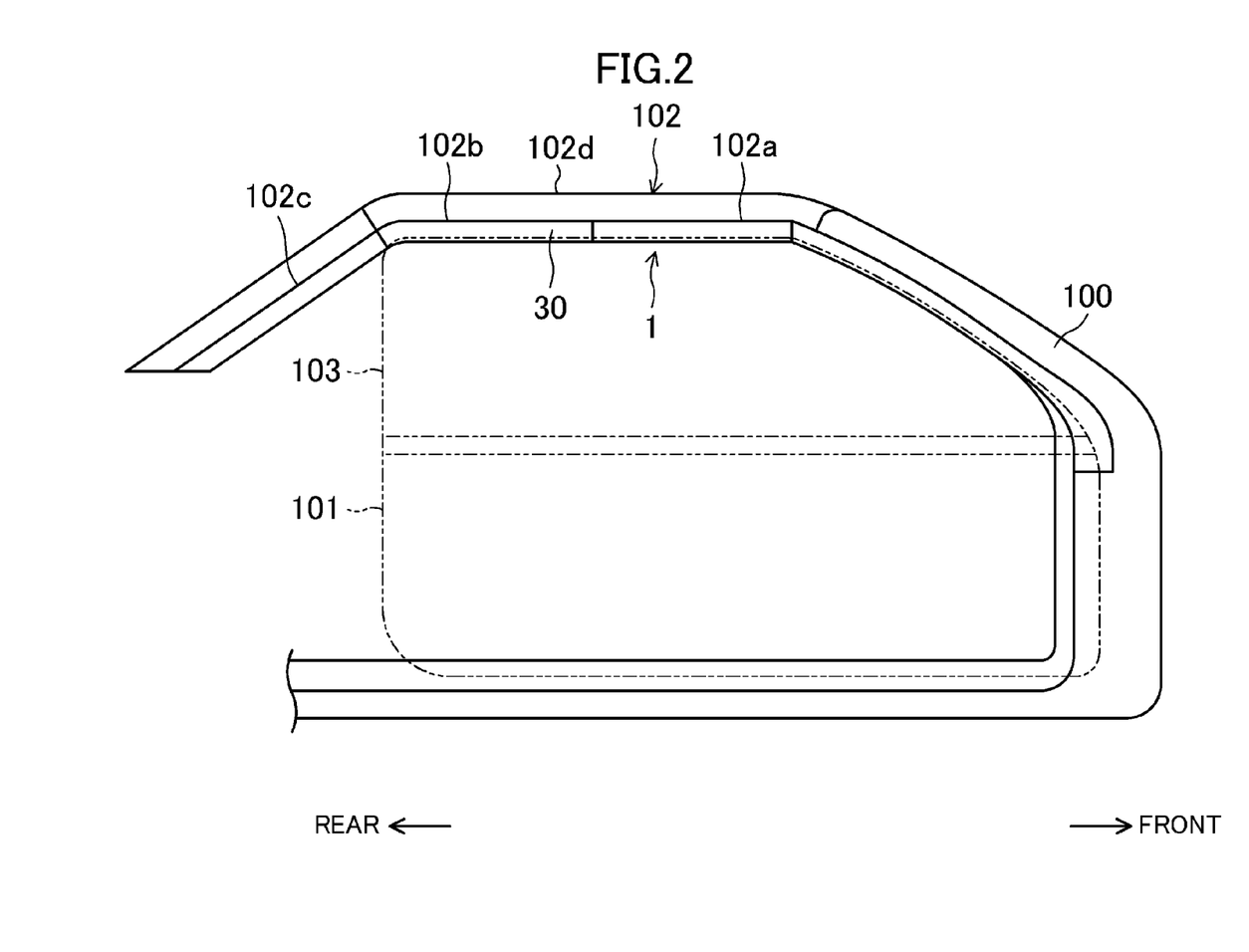
FIG. 2 is a right side view illustrating a framework of the vehicle.

The framework of this vehicle includes a pair of pillars 100 extending upward from respective lateral portions of a front portion of a floor panel (not shown) of the vehicle, as illustrated in FIG. 2. A front end portion of each front door 101 is attached to an associated one of the pillars 100 via a hinge (not shown) so that the front door 101 is openable and closable. While a lower half portion of each pillar 100 extends substantially perpendicularly, an upper half portion thereof extends while being inclined rearward toward the upper end of the pillar 100. The front end of the roof 102 is detachably coupled to the upper end of each pillar 100. The roof 102 is comprised of a plurality of roof components 102a, 102b, and 102c, which are combined together so as to be arranged in a longitudinal direction of the vehicle. These roof components 102a, 102b, and 102c are coupled together via links (not shown). A switch is made between a state where the driving force of a driver (not shown) is transmitted to the roof components 102a, 102b, and 102c, which are thus unfolded as illustrated in FIG. 1 to form the roof 102, and a state where, although not shown, the roof components 102a, 102b, and 102c are folded and housed in a rear portion of the cabin.

Each front door 101 includes a movable window pane 103. The movable window pane 103 is driven vertically by a movable window unit (not shown). The front door 101 of this embodiment is a so-called sashless door having an upper half portion with no sash surrounding the movable window pane 103.

The roof components 102a, 102b, and 102c have different lengths in the longitudinal direction of the vehicle and different shapes, for example. However, all fundamental portions of their structure to which a sealing member 30 is attached are identical. Thus, the roof component 102b disposed halfway through the roof 102 in the longitudinal direction thereof will now be described.

Figure 4:
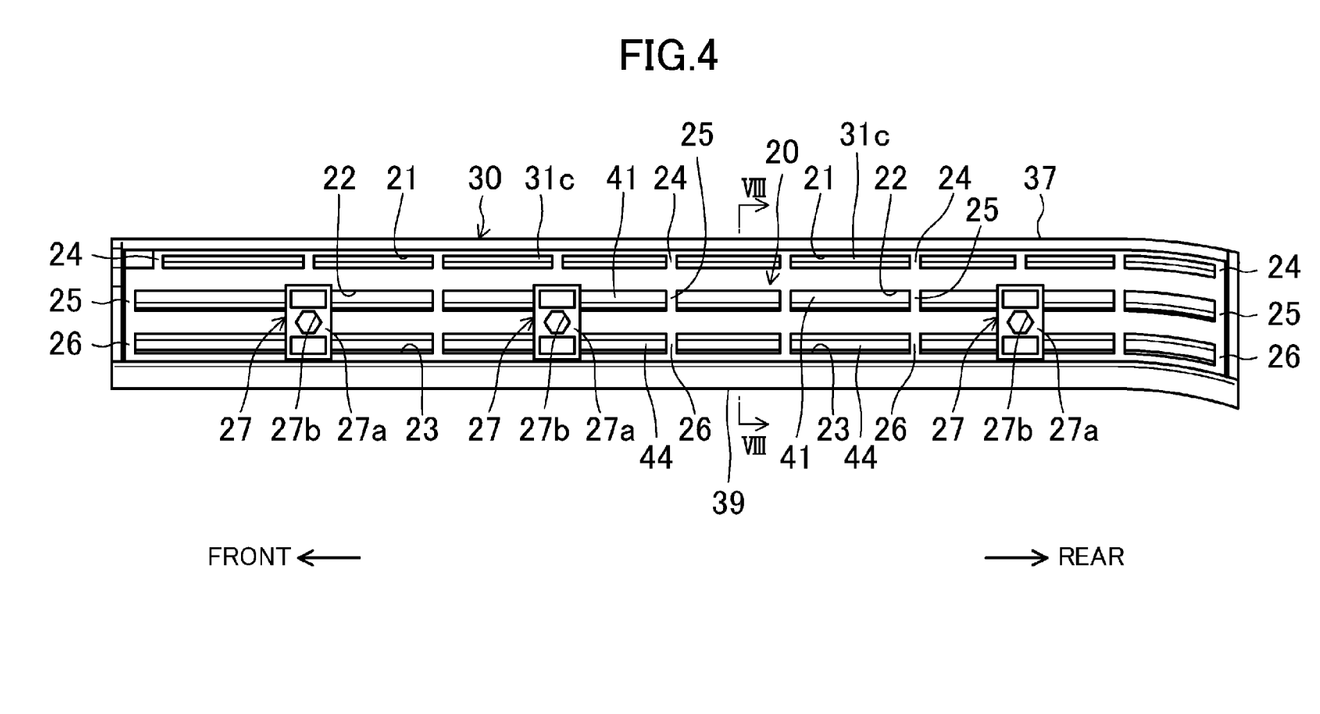
FIG. 4 is a side view of a retainer to which the sealing member has been attached as viewed from inside the cabin.
Figure 5:
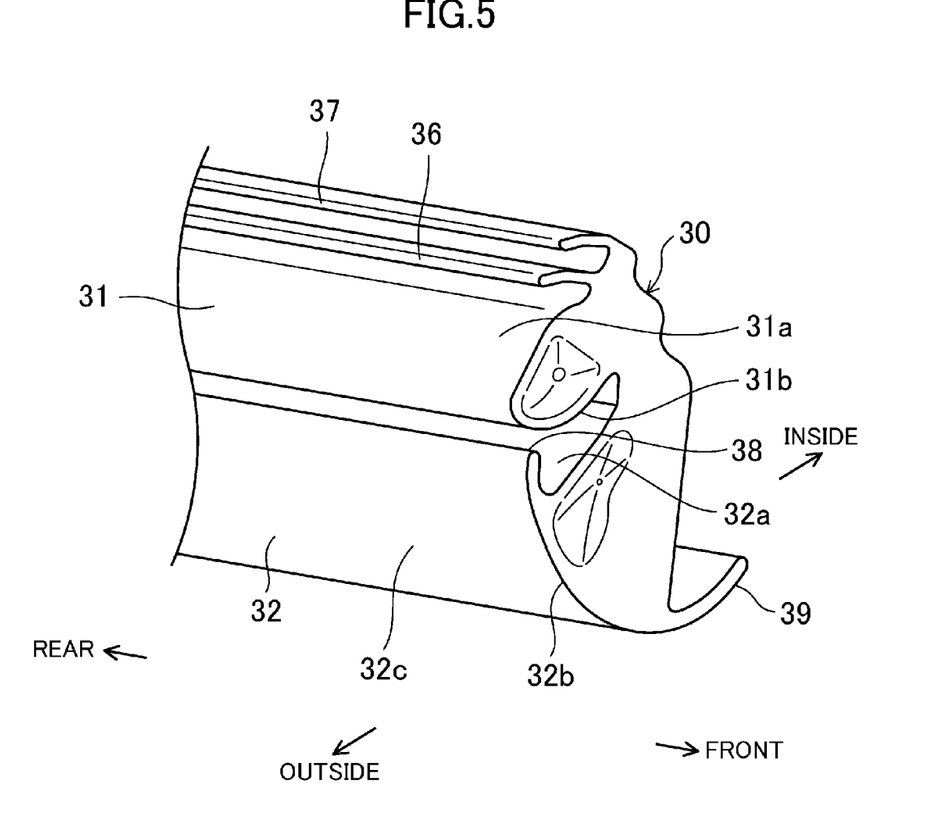
FIG. 5 is a perspective view of the sealing member as viewed from the front side thereof.

The roof component 102b includes a covering material 102d covering the roof 102, and a framework (not shown) in addition to the links described above. Retainers 20 (shown in, for example, FIGS. 4, 6, and 7) to each of which the sealing member 30 is attached are respectively fixed to both side portions of the framework in the lateral direction of the vehicle. The sealing member 30 is made of an elastic material to seal the gap between the roof 102 and the upper edge of the movable window pane 103.

(Configuration of Retainer 20)

Figure 7:
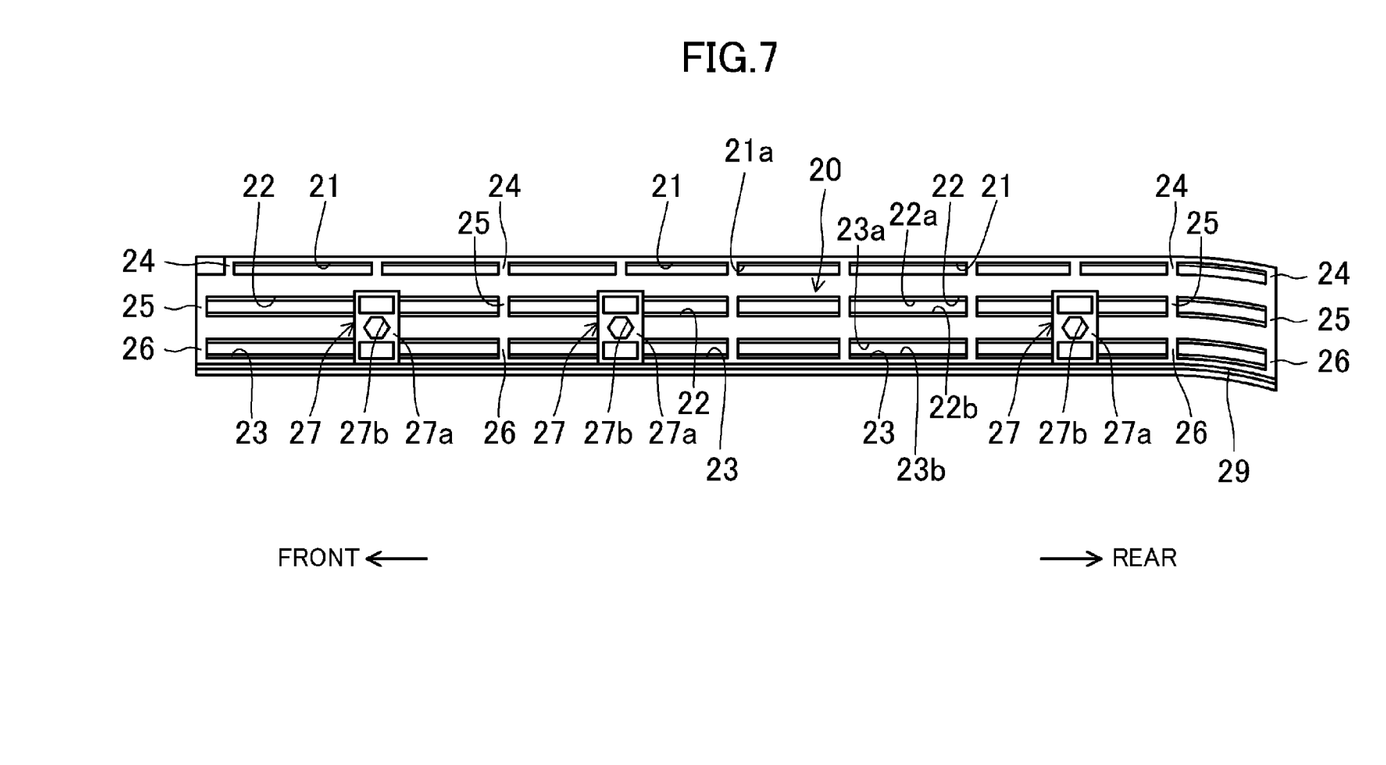
FIG. 7 is a side view of the retainer as viewed from inside the cabin.
Figure 8:
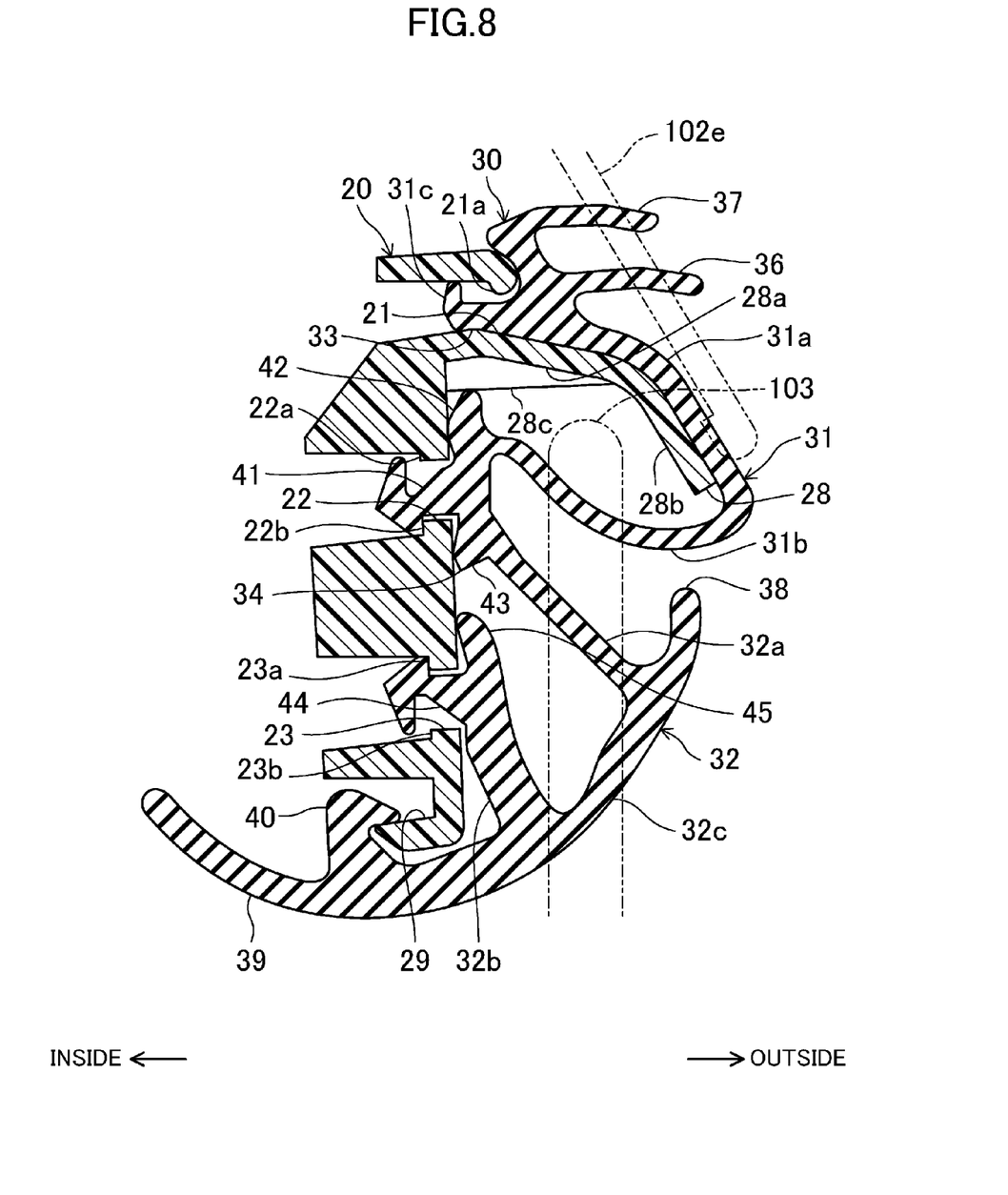
FIG. 8 is a cross-sectional view taken along the plane VIII-VIII shown in FIG. 4.

The retainer 20 is an elongate member extending along a lateral edge of the covering material 102d in the longitudinal direction of the vehicle, and is an integrally formed product formed out of a highly rigid member obtained by molding or forming a hard resin or metallic material, for example. As illustrated in FIGS. 7 and 8, an upper portion of the retainer 20 has a plurality of upper engagement holes 21, 21, . . . spaced apart from one another in the longitudinal direction of the retainer 20 (in the vehicle longitudinal direction). A vertically intermediate portion of the retainer 20 has a plurality of intermediate engagement holes 22, 22, . . . spaced apart from one another in the longitudinal direction of the retainer 20 under the upper engagement holes 21. The vertically intermediate portion of the retainer 20 further has a plurality of lower engagement holes (first engagement holes) 23, 23, . . . spaced apart from one another in the longitudinal direction of the retainer 20 under the intermediate engagement holes 22. Although not shown, in particular, if the retainer 20 is made by being molded of a resin material, portions of the retainer 20 between the upper engagement holes 21 and the intermediate engagement holes 22 and between the intermediate engagement holes 22 and the lower engagement holes 23 may have a recess to prevent shrinkage after molding.

The upper, intermediate, and lower engagement holes 21, 22, and 23 are formed in the form of slits extending in the longitudinal direction of the retainer 20. As illustrated in FIG. 7, upper vertical walls 24 extending vertically each define the front or rear end of an associated one of the upper engagement holes 21 of the retainer 20. In other words, one of the upper vertical walls 24 is located between each adjacent pair of the upper engagement holes 21, 21.

Furthermore, intermediate vertical walls 25 extending vertically each define the front or rear end of an associated one of the intermediate engagement holes 22 of the retainer 20. In other words, one of the intermediate vertical walls 25 is located between each adjacent pair of the intermediate engagement holes 22, 22. In addition, lower vertical walls 26 extending vertically each define the front or rear ends of the lower engagement holes 23 of the retainer 20. In other words, one of the lower vertical walls 26 is located between each adjacent pair of the lower engagement holes 23, 23.

The upper, intermediate, and lower vertical walls 24, 25, and 26 are arranged vertically in the top-to-bottom direction of the retainer 20. In other words, the upper, intermediate, and lower vertical walls 24, 25, and 26 are arranged in a direction intersecting with the longitudinal direction of the sealing member 30, i.e., the front-to-rear direction.

The retainer 20 is provided with a plurality of fasteners 27, which are fastened to the roof component 102b with fastening members (not shown) and spaced apart from one another in the longitudinal direction of the retainer 20. Each fastener 27 is configured as a fastening plate 27a having a fastening hole 27b running through the fastening plate 27a. The fastening plate 27a extends vertically from a region of the vertically intermediate portion of the retainer 20 between adjacent ones of the intermediate engagement holes 22, 22 to a region thereof between adjacent ones of the lower engagement holes 23, 23. Each fastening member is inserted through an associated one of the fastening holes 27b.

As illustrated in FIG. 8, a portion of the retainer 20 adjoining the upper edge of each upper engagement hole 21 has an upper protrusion 21a protruding downward and extending along the upper edge. The formation of this upper protrusion 21a makes the vertical dimension of an outer portion of the upper engagement hole 21 in the lateral direction of the vehicle shorter than that of an inner portion thereof.

A portion of the retainer 20 adjoining the lower edge of each upper engagement hole 21 has an extending plate portion 28 extending outward in the lateral direction of the vehicle. A basal end portion of the extending plate portion 28 is configured as a first inclined portion 28a extending from the lower edge of the upper engagement hole 21 while being inclined downward toward the outer end of the vehicle in the lateral direction thereof. A tip end portion of the extending plate portion 28 is configured as a second inclined portion 28b extending from the tip end of the first inclined portion 28a while being more steeply inclined downward toward the outer end of the vehicle in the lateral direction thereof than is the first inclined portion 28a.

The extending plate portion 28 is provided with a rib 28c to reinforce the basal end portion of the extending plate portion 28. The rib 28c forms an integral part of the lower surface of the first inclined portion 28a of the extending plate portion 28, and is continuous with a portion of the retainer 20 above the intermediate engagement holes 22. The degree of protrusion of the rib 28c from the lower surface of the first inclined portion 28a, i.e., the vertical dimension of the rib 28c, is set to decrease toward the tip end of the extending plate portion 28.

The extending plate portion 28 extends outward to reach a point that is closer to the outer end of the vehicle in the lateral direction thereof than the upper edge of the closed movable window pane 103 (indicated by the phantom lines shown in FIG. 8) is. The tip end of the second inclined portion 28b of the extending plate portion 28 is located below the upper edge of the closed movable window pane 103. Thus, if the movable window pane 103, when closed, is about to be displaced outward in the lateral direction of the vehicle due to a negative pressure applied thereto by high-speed driving of the vehicle, the upper edge of the movable window pane 103 is supported from outside in the lateral direction of the vehicle by the extending plate portion 28, thereby reducing the displacement of the movable window pane 103. Note that the movable window pane 103 is automatically controlled by the movable window unit to slightly move downward during the opening/closing operation of the front door 101 to prevent it from interfering with the extending plate portion 28, and then to move upward to the end of its upward travel after completion of the opening/closing operation. This control has been known in the related art.

A portion of the retainer 20 adjoining the upper edge of each intermediate engagement hole 22 has an upper protrusion 22a protruding downward and extending along the upper edge. A portion of the retainer 20 adjoining the lower edge of the intermediate engagement hole 22 has a lower protrusion 22b protruding upward and extending along the lower edge. The formation of the upper and lower protrusions 22a and 22b makes the vertical dimension of an outer portion of the intermediate engagement hole 22 in the lateral direction of the vehicle shorter than that of an inner portion thereof.

Just like the intermediate engagement hole 22, a portion of the retainer 20 adjoining the upper edge of each lower engagement hole 23 has an upper protrusion 23a, and a portion thereof adjoining the lower edge of the lower engagement hole 23 has a lower protrusion 23b. The formation of the upper and lower protrusions 23a and 23b makes the vertical dimension of an outer portion of the lower engagement hole 23 in the lateral direction of the vehicle shorter than that of an inner portion thereof.

An inner engagement hole (second engagement hole) 29 is formed on a lower portion of the inner surface of the retainer 20 in the lateral direction of the vehicle. The inner engagement hole 29 opens at the inner surface of the retainer 20 in the lateral direction of the vehicle, and extends in the longitudinal direction thereof.

(Configuration of Sealing Member 30)

The sealing member 30 may include, as its material, any elastic material with water-stopping property, such as rubber (e.g., ethylene-propylene-diene rubber (EPDM)) or thermoplastic elastomer (TPE), and is an integrally formed product obtained by extruding or molding this material. In this embodiment, the sealing member 30 is supposed to be obtained by molding. However, the molding process is merely an example of the present disclosure.

Figure 3:
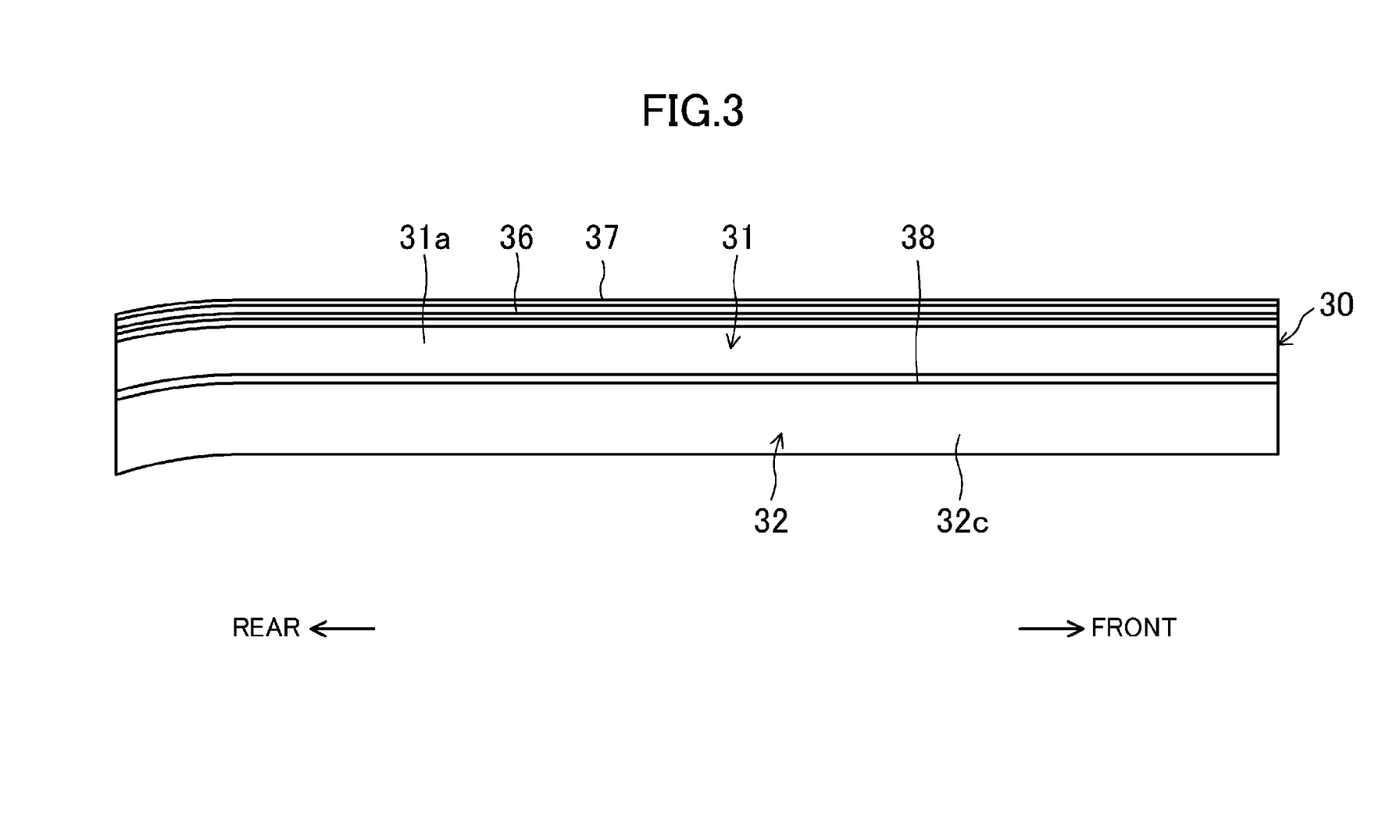
FIG. 3 is a side view of the sealing member as viewed from outside the cabin.
Figure 6:
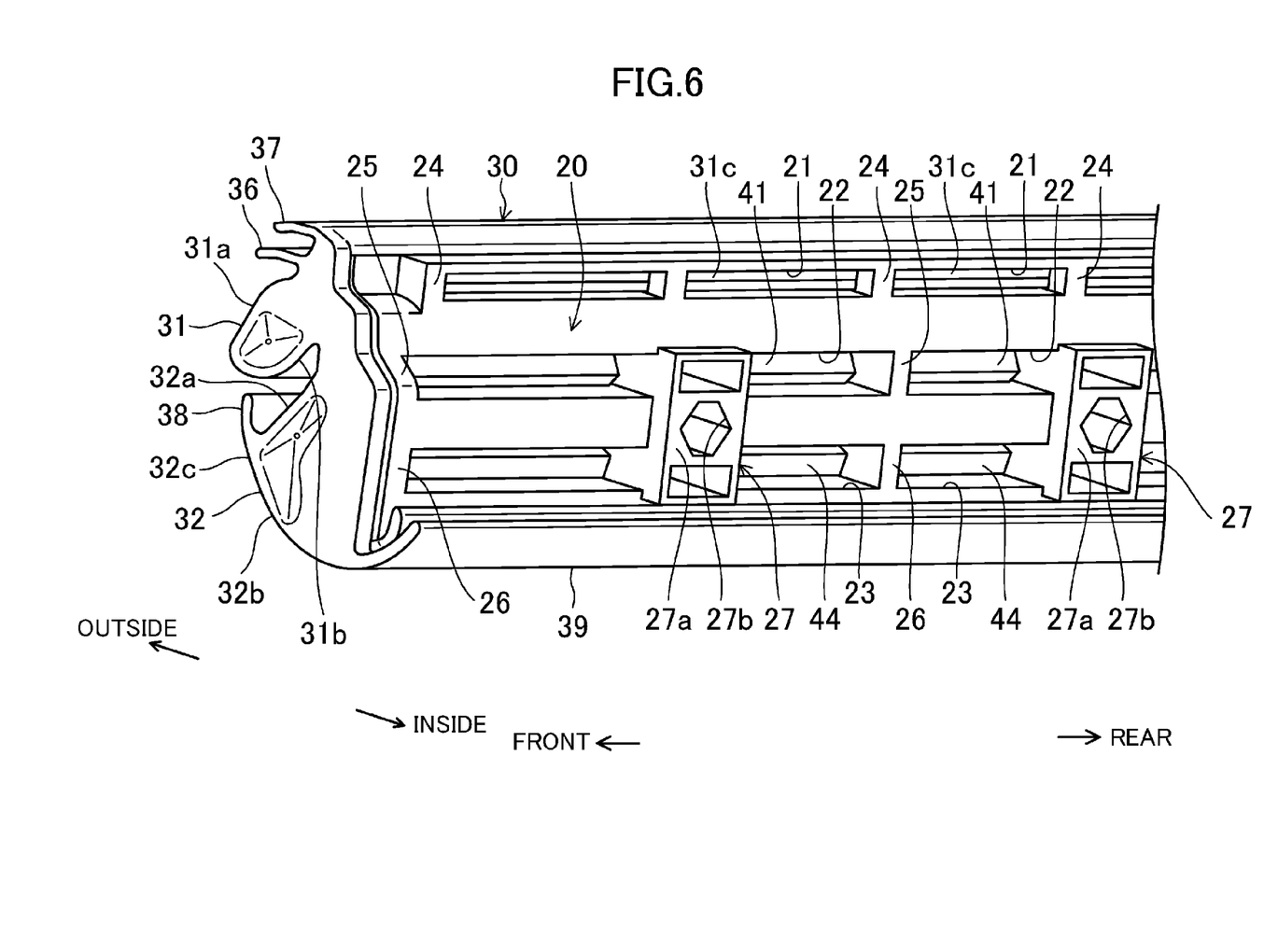
FIG. 6 is a perspective view of the retainer to which the sealing member has been attached as viewed from inside the cabin.

The sealing member 30 has an overall shape that is long in the front-to-rear direction thereof as illustrated in FIG. 3, and is formed to cover the retainer 20 from the outside in the lateral direction of the vehicle, from above, and from below as illustrated in FIGS. 6 and 8, and to cover both end portions of the retainer 20 in the longitudinal direction thereof. Thus, as illustrated in FIG. 2, the sealing member 30 attached to the retainer 20 makes the retainer 20 invisible from the outside in the lateral direction of the vehicle and from below the vehicle.

As illustrated in FIG. 8, an upper hollow seal portion 31 is formed as an upper portion of the sealing member 30, and a lower hollow seal portion 32 is formed as a lower portion thereof. An inner portion of the upper hollow seal portion 31 in the lateral direction of the vehicle has an upper slit 33. The upper slit 33 is configured to open the upper hollow seal portion 31 to the inside of the vehicle in the lateral direction thereof. A core (not shown) of a mold die for molding the inner face of the upper hollow seal portion 31 is removed through the upper slit 33.

The extending plate portion 28 of the retainer 20 is inserted through the upper slit 33 into the upper hollow seal portion 31. An upper wall 31a of the upper hollow seal portion 31 extends along the upper surface of the extending plate portion 28 of the retainer 20 while being inclined downward toward the outer end of the vehicle in the lateral direction thereof. A lower wall 31b of the upper hollow seal portion 31 is spaced apart downwardly from the lower surface of the extending plate portion 28 of the retainer 20, and, as a whole, extends while being curved downward toward the outer end of the vehicle in the lateral direction thereof. The tip ends of the upper and lower walls 31a and 31b of the upper hollow seal portion 31 are continuous with each other.

A portion of the upper hollow seal portion 31 adjoining the upper edge of the upper slit 33 has an upper protrusion 31c protruding upward and extending in the front-to-rear direction. The upper protrusion 31c is engaged with a portion of the retainer 20 around the upper engagement hole 21 while being inserted into the upper engagement hole 21 of the retainer 20. In this case, the upper protrusion 31c is engaged with the upper protrusion 21a adjoining the upper engagement hole 21 so as to be hooked thereon from the inside in the lateral direction of the vehicle.

The outer surface of the upper wall 31a of the upper hollow seal portion 31 is provided with first and second lip portions 36 and 37. The first lip portion 36 is spaced apart upwardly from the upper wall 31a of the upper hollow seal portion 31, and extends outward in the lateral direction of the vehicle. The second lip portion 37 is spaced apart upwardly from the upper surface of the first lip portion 36, and extends outward in the lateral direction of the vehicle. This second lip portion 37 is located above the upper portion of the retainer 20. A metallic panel 102e of the roof component 102b comes in contact with the first and second lip portions 36 and 37 from the outside in the lateral direction of the vehicle.

An inner portion of the lower hollow seal portion 32 in the lateral direction of the vehicle has a lower slit (opening portion) 34. The lower slit 34 is configured to open the lower hollow seal portion 32 toward the inside in the lateral direction of the vehicle. A core (not shown) of a mold die for molding the inner face of the lower hollow seal portion 32 is removed through the lower slit 34. Opening a portion of the lower hollow seal portion 32 as described above allows the core of the mold die to be easily removed from the inside of the lower hollow seal portion 32 after the molding of the lower hollow seal portion 32 even if the core is large. This increases the degree of freedom in defining the shape of the lower hollow seal portion 32. The same statement also applies to the upper hollow seal portion 31.

An upper wall 32a of the lower hollow seal portion 32 is spaced apart downwardly from the lower wall 31b of the upper hollow seal portion 31, and extends so as to be inclined downwardly toward the outer end of the vehicle in the lateral direction thereof. A lower wall 32b of the lower hollow seal portion 32 also extends so as to be inclined downward toward the outer end of the vehicle in the lateral direction thereof, and is more steeply inclined than the upper wall 32a. Thus, the vertical dimension of the lower hollow seal portion 32 increases toward the outer end of the vehicle in the lateral direction thereof. The outer ends of the upper and lower walls 32a and 32b of the lower hollow seal portion 32 are connected together via a lateral wall 32c.

An outer end portion of the upper wall 32a of the lower hollow seal portion 32 has a projection 38 protruding upward and extending in the front-to-rear direction. The projection 38 is located inside an outer end portion of the upper hollow seal portion 31 in the lateral direction of the vehicle, and has a tip end portion facing the lower surface of the lower wall 31b of the upper hollow seal portion 31.

A lower portion of the sealing member 30 has an extending portion 39 that extends inward in the lateral direction of the vehicle to cover a lower portion of the retainer 20. The extending portion 39 extends inward to reach a point inside the inner end of the retainer 20 in the lateral direction of the vehicle, and is curved downward as a whole.

The upper surface of the extending portion 39 is provided with a lower engagement protrusion (second engagement protrusion) 40 protruding upward. The lower engagement protrusion 40 is inserted into, and engaged with, the inner engagement hole 29 of the lower portion of the retainer 20. A tip end portion of the lower engagement protrusion 40 is bent outward in the lateral direction of the vehicle, and is inserted into the inner engagement hole 29 of the retainer 20. The tip end portion of the lower engagement protrusion 40 is tapered.

An upper engagement protrusion 41 is formed between the upper and lower hollow seal portions 31 and 32 of the sealing member 30, protrudes inward in the lateral direction of the vehicle, and extends in the longitudinal direction thereof. A tip end portion of the upper engagement protrusion 41 has a broader width, i.e., has a larger vertical dimension than a basal end portion thereof. The tip end portion of the upper engagement protrusion 41 is tapered.

The upper engagement protrusion 41 is engaged with a portion of the retainer 20 around the intermediate engagement hole 22 while being inserted into the intermediate engagement hole 22 of the retainer 20. In this case, the tip end portion of the upper engagement protrusion 41 is engaged with the upper and lower protrusions 22a and 22b adjoining the intermediate engagement hole 22 so as to be hooked thereon from inside in the lateral direction of the vehicle.

A portion of the sealing member 30 above the upper engagement protrusion 41 has an upper contact portion 42, which comes in contact with a portion of the retainer 20 adjoining the upper edge of the intermediate engagement hole 22 from outside in the lateral direction of the vehicle so as to be supported by the retainer 20.

A portion of the sealing member 30 below the upper engagement protrusion 41 has an intermediate contact portion 43, which comes in contact with a portion of the retainer 20 adjoining the lower edge of the intermediate engagement hole 22 from outside in the lateral direction of the vehicle so as to be supported by the retainer 20.

An inner portion of the lower hollow seal portion 32 of the sealing member 30 in the lateral direction of the vehicle has an intermediate engagement protrusion (first engagement protrusion) 44 protruding inward and extending in the longitudinal direction of the vehicle. A tip end portion of the intermediate engagement protrusion 44 has a broader width, i.e., has a larger vertical dimension than a basal end portion thereof. The tip end portion of the intermediate engagement protrusion 44 is tapered.

The intermediate engagement protrusion 44 is engaged with a portion of the retainer 20 around the lower engagement hole 23 by being inserted into the lower engagement hole 23 of the retainer 20. In this case, the intermediate engagement protrusion 44 is engaged with the upper and lower protrusions 23a and 23b adjoining the lower engagement hole 23 so as to be hooked thereon from inside in the lateral direction of the vehicle.

A portion of the sealing member 30 above the intermediate engagement protrusion 44 has a lower contact portion 45, which comes in contact with a portion of the retainer 20 adjoining the upper edge of the lower engagement hole 23 from outside in the lateral direction of the vehicle so as to be supported by the retainer 20.

(How Sealing Member 30 is Attached)

Next, it will be described how the sealing member 30 may be attached to the retainer 20. The extending plate portion 28 of the retainer 20 is inserted from its tip end through the upper slit 33 of the sealing member 30 into the interior of the upper hollow seal portion 31. In this case, the extending plate portion 28 may be inserted highly efficiently. This is because the extending plate portion 28 includes the first inclined portion 28a that extends so as to be inclined downward toward the outer end of the vehicle in the lateral direction thereof, and the second inclined portion 28b that is more steeply inclined than the first inclined portion 28a. When the extending plate portion 28 is inserted fully, a lower end portion of the rib 28c comes in contact with the lower edge of the upper slit 33 of the sealing member 30, and the upper surface of the extending plate portion 28 comes in contact with the upper edge of the upper slit 33. In this manner, the extending plate portion 28 is positioned with respect to the sealing member 30.

In parallel with, or after, the insertion of the extending plate portion 28, the upper protrusion 31c, upper engagement protrusion 41, and intermediate engagement protrusion 44 of the sealing member 30 are respectively inserted into the upper, intermediate, and lower engagement holes 21, 22, and 23 of the retainer 20 from outside to inside of the retainer 20 in the lateral direction of the vehicle. While being inserted into these holes 21, 22, and 23, the upper protrusion 31c, the upper engagement protrusion 41, and the intermediate engagement protrusion 44 are pressed against, and elastically deformed by, the respective edges of the upper engagement hole 21, intermediate engagement hole 22, and lower engagement hole 23. Furthermore, the tip end portion of the lower engagement protrusion 40 is also inserted into the inner engagement hole 29 of the retainer 20.

As illustrated in FIG. 6, when the upper protrusions 31c of the sealing member 30 are inserted into, and engaged with, the upper engagement holes 21 of the retainer 20, each upper vertical wall 24 of the retainer 20 is interposed between, and engaged with, associated adjacent ones of the upper protrusions 31c, 31c in the longitudinal direction of the sealing member 30. Thus, the upper vertical wall 24 engages with the sealing member 30 in the longitudinal direction of the sealing member 30 to reduce the displacement of the sealing member 30 in the longitudinal direction thereof. More specifically, the sealing member 30 has groove-shaped notches between adjacent ones of the upper protrusions 31c at locations corresponding to the upper vertical walls 24 of the retainer 20. Thus, when the upper protrusions 31c of the sealing member 30 are inserted into, and engaged with, the upper engagement holes 21 of the retainer 20, the upper protrusions 31c do not interfere with the upper vertical walls 24.

The sealing member 30 further has groove-shaped notches between adjacent ones of the upper engagement protrusions 41 just like the upper protrusions 31c described above. When the upper engagement protrusions 41 are inserted into, and engaged with, the intermediate engagement holes 22 of the retainer 20, each intermediate vertical wall 25 of the retainer 20 is interposed between, and engaged with, associated adjacent ones of the upper engagement protrusions 41, 41 in the longitudinal direction of the sealing member 30. Thus, the intermediate vertical walls 25 engage with the sealing member 30 in the longitudinal direction of the sealing member 30 to reduce the displacement of the sealing member 30 in the longitudinal direction thereof.

Likewise, the sealing member 30 further has groove-shaped notches between adjacent ones of the intermediate engagement protrusions 44. When the intermediate engagement protrusions 44 are inserted into, and engaged with, the lower engagement holes 23 of the retainer 20, each lower vertical wall 26 of the retainer 20 is interposed between, and engaged with, associated adjacent ones of the intermediate engagement protrusions 44, 44 in the longitudinal direction of the sealing member 30. Thus, the lower vertical walls 26 engage with the sealing member 30 in the longitudinal direction of the sealing member 30 to reduce the displacement of the sealing member 30 in the longitudinal direction thereof.

(Advantages)

As can be seen from the foregoing description, when the sealing member 30 is attached to the retainer 20, the upper, intermediate, and lower vertical walls 24, 25, and 26 of the retainer 20 may be respectively engaged with the upper protrusions 31*c*, upper and intermediate engagement protrusions 41 and 44 of the sealing member 30. Thus, the upper, intermediate, and lower vertical walls 24, 25, and 26 may engage with the sealing member 30 in the longitudinal direction of the sealing member 30 to reduce the displacement of the sealing member 30 in the longitudinal direction thereof. This may prevent the sealing member 30 from being finally displaced relative to the retainer 20 even if this attachment process is carried on while the sealing member 30, for example, is pulled, and may also eliminate variations in the length of the sealing member 30.

The upper vertical walls 24 are spaced apart from one another in the longitudinal direction of the sealing member 30, and so are the intermediate and lower vertical walls 25 and 26. This thus reduces a dispersion in the attachment position of the sealing member 30 to the retainer 20 with reliability.

If the movable window pane 103 is moved upward and closed in the state where the retainer 20 to which the sealing member 30 has been attached as described above is fastened to the vehicle, the upper edge of the movable window pane 103 is pressed against the lower hollow seal portion 32 of the sealing member 30 from under the seal portion 32. When the upper edge of the movable window pane 103 is pressed against the lower hollow seal portion 32, the lower hollow seal portion 32 is deformed, and the intermediate contact portion 43 comes in contact with the lower edge of the intermediate engagement hole 22 of the retainer 20 from outside in the lateral direction of the vehicle, and is supported by the retainer 20. This may prevent collapsing deformation of the lower hollow seal portion 32, and may ensure close contact between the lower hollow seal portion 32 and the movable window pane 103.

The upper edge of the movable window pane 103 being closed slides on the lateral wall 32*c* of the lower hollow seal portion 32, and is finally pressed against the lower wall 31*b* of the upper hollow seal portion 31 from under the seal portion 31. When the upper edge of the movable window pane 103 is pressed against the upper hollow seal portion 31, the upper hollow seal portion 31 is deformed so as to be crushed, thereby bringing the upper hollow seal portion 31 into close contact with and the upper edge of the movable window pane 103.

Thus, the sealing member 30 according to this embodiment has the lower slit 34 that is open in an inner portion of the lower hollow seal portion 32 in the lateral direction of the vehicle. Thus, even if the core of the mold die for molding is large, the core may be easily removed after molding, and the degree of freedom in defining the shape of the lower hollow seal portion 32 may be increased. The intermediate engagement protrusions 44 of the lower hollow seal portion 32 may be inserted into, and engaged with, the lower engagement holes 23 of the retainer 20, so that the sealing member 30 is attached to the retainer 20. If, in this state, the upper edge of the movable window pane 103 being closed is pressed against the lower hollow seal portion 32 from under the seal portion 32, the lower contact portion 45 of the lower hollow seal portion 32 comes in contact with portions of the retainer 20 around the lower engagement holes 23 so as to be supported by the retainer 20. This may reduce the deformation of the lower hollow seal portion 32, and as a result, may ensure sufficient sealability.

The tip end portion of each intermediate engagement protrusion 44 of the sealing member 30 in the direction of protrusion of the intermediate engagement protrusion 44 is wider than the basal end portion thereof, and is engaged with the inner surface of the associated lower engagement hole 23 of the retainer 20 so as to be hooked thereon. This makes the tip end portion of the intermediate engagement protrusion 44 of the sealing member 30 hardly disengageable from the lower engagement hole 23.

The lower slit 34 of the lower hollow seal portion 32 may be covered with the retainer 20 in the state where the sealing member 30 has been attached to the retainer 10. Thus, a closed cross section may be defined by the lower hollow seal portion 32 and the retainer 20, which further improves the sealability. Likewise, a closed cross section may also be defined by the upper hollow seal portion 31 and the retainer 20 to further improve the sealability.

The foregoing description of embodiments is merely an example in all aspects, and should not be construed to be limiting. All the modifications and changes which fall within the scope of equivalents of the appended claims are within the scope of the present disclosure.

As can be seen from the foregoing description, the vehicle sealing member according to the present disclosure may be provided for the roof of, for example, a convertible or hardtop automobile.

What is claimed is:

1. A vehicle sealing member to be attached to a retainer fixed to a roof of a vehicle including sashless doors, the vehicle sealing member being made of an elastic material configured to seal a gap between the roof and an upper edge of a movable window pane of an associated one of the sashless doors, the vehicle sealing member comprising:

a hollow seal portion against which the upper edge of the movable window pane is pressed from under the seal portion, wherein:

an inner portion of the hollow seal portion in a lateral direction of the vehicle has an opening portion, and the inner portion of the hollow seal portion in the lateral direction of the vehicle has a first engagement protrusion and a contact portion, the first engagement protrusion being inserted into, and engaged with, a first engagement hole of the retainer, the contact portion coming in contact with a portion of the retainer around the first engagement hole from outside in the lateral direction of the vehicle so as to be supported by the retainer.

2. The vehicle sealing member of claim 1, wherein:

a tip end portion of the first engagement protrusion of the sealing member in a direction of protrusion of the first engagement protrusion is wider than a basal end portion of the first engagement protrusion, and the tip end portion is engaged with an inner surface of the first engagement hole of the retainer so as to be hooked on the inner surface.

3. The vehicle sealing member of claim 1, wherein:

the opening portion of the hollow seal portion is covered with an outer surface of the retainer in the lateral direction of the vehicle, and a closed cross section is defined by the hollow seal portion and the retainer.

4. The vehicle sealing member of claim 1, wherein the contact portion is provided above the first engagement protrusion.

5. The vehicle sealing member of claim 1, wherein:

a lower portion of the sealing member has an extending portion extending inward from outside in the lateral direction of the vehicle to cover a lower portion of the retainer, and the extending portion has a second engagement protrusion inserted into, and engaged with, a second engagement hole formed in the lower portion of the retainer.

* * * * *